United States Patent
Mo et al.

(10) Patent No.: US 7,447,812 B1
(45) Date of Patent: Nov. 4, 2008

(54) MULTI-QUEUE FIFO MEMORY DEVICES THAT SUPPORT FLOW-THROUGH OF WRITE AND READ COUNTER UPDATES USING MULTI-PORT FLAG COUNTER REGISTER FILES

(75) Inventors: Jason Zhi-Cheng Mo, Fremont, CA (US); Prashant Shamarao, Alpharetta, GA (US); Jianghui Su, Cupertino, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 328 days.

(21) Appl. No.: 11/080,704

(22) Filed: Mar. 15, 2005

Related U.S. Application Data

(60) Provisional application No. 60/555,716, filed on Mar. 23, 2004.

(51) Int. Cl.
*G06F 3/00* (2006.01)
*G06F 5/10* (2006.01)
*G06F 13/14* (2006.01)

(52) U.S. Cl. .............................. 710/52; 710/53; 710/54; 710/55; 710/56; 710/57; 711/131; 711/142

(58) Field of Classification Search .................... 710/14; 711/131, 142
See application file for complete search history.

(56) References Cited

U.S. PATENT DOCUMENTS

| | | | |
|---|---|---|---|
| 4,486,854 A | 12/1984 | Yuni | |
| 4,873,666 A | 10/1989 | Lefebvre et al. | |
| 4,888,739 A | 12/1989 | Frederick et al. | |
| 5,079,693 A | 1/1992 | Miller | |
| 5,084,891 A | 1/1992 | Ariyavisitakul et al. | |
| 5,506,809 A | 4/1996 | Csoppenszkey et al. | |
| 5,508,679 A | 4/1996 | McClure | |

(Continued)

FOREIGN PATENT DOCUMENTS

JP 2004-139377 A 5/2004

OTHER PUBLICATIONS

Tseng et al., "Banked Multiported Register File for Superscalar Microprocessors," MIT Laboratory for Computer Science, Mar. 2003, pp. 123-124.

(Continued)

*Primary Examiner*—Hyung Sough
*Assistant Examiner*—Kris Rhu
(74) *Attorney, Agent, or Firm*—Myers Bigel Sibley & Sajovec

(57) ABSTRACT

Multi-queue first-in first-out (FIFO) memory devices include multi-port register files that provide write count and read count flow-through when the write and read queues are equivalent. According to some of these embodiments, a multi-queue FIFO memory device includes a write flag counter register file that is configured to support flow-through of write counter updates to at least one read port of the write flag counter register file. This flow-through occurs when an active write queue and an active read queue within the FIFO memory device are the same. A read flag counter register file is also provided, which supports flow-through of read counter updates to at least one read port of the read flag counter register file when the active write queue and the active read queue are the same.

7 Claims, 9 Drawing Sheets

U.S. PATENT DOCUMENTS

| | | | |
|---|---|---|---|
| 5,590,087 | A | 12/1996 | Chung et al. |
| 5,790,461 | A | 8/1998 | Holst |
| 6,044,418 | A | 3/2000 | Muller |
| 6,076,130 | A * | 6/2000 | Sharma .................. 710/310 |
| 6,112,019 | A | 8/2000 | Chamdani et al. |
| 6,145,061 | A | 11/2000 | Garcia et al. |
| 6,340,897 | B1 | 1/2002 | Lytle et al. |
| 6,466,497 | B1 | 10/2002 | Desai et al. |
| 6,525,980 | B1 | 2/2003 | Au et al. |
| 6,526,495 | B1 * | 2/2003 | Sevalia et al. ............ 711/173 |
| 6,564,331 | B1 | 5/2003 | Joshi |
| 6,604,190 | B1 | 8/2003 | Tran |
| 6,678,759 | B2 | 1/2004 | Stockton et al. |
| 6,738,306 | B2 * | 5/2004 | McLaury ............... 365/230.05 |
| 6,745,264 | B1 | 6/2004 | Luke et al. |
| 6,757,679 | B1 | 6/2004 | Fritz |
| 6,795,360 | B2 | 9/2004 | Au et al. |
| 7,093,037 | B2 | 8/2006 | Duckman |
| 7,095,674 | B2 * | 8/2006 | Spix et al. ............. 365/230.05 |
| 2002/0080672 | A1 | 6/2002 | Lee et al. |
| 2003/0018862 | A1 * | 1/2003 | Karnstedt et al. .......... 711/156 |
| 2003/0034797 | A1 | 2/2003 | Bentz |
| 2003/0120842 | A1 | 6/2003 | Bace |
| 2006/0017497 | A1 | 1/2006 | Mo et al. |
| 2006/0018177 | A1 | 1/2006 | Au et al. |
| 2006/0020743 | A1 | 1/2006 | Au et al. |

OTHER PUBLICATIONS

"Computer Architecture, The Anatomy of Modern Processors," http://ciips.ee.uwa.edu.au/~morris/CA406/registers.html, Printed Dec. 6, 2003, 2 pages.

"Fujitsu Develops Multiport Register File Technology with High-Speed, Low-Power Operation," http://pr.fujitsu.com/en/news/2002/02/7-3.html, Tokyo, Feb. 7, 2002, Printed Dec. 6, 2003, 4 pages.

* cited by examiner

MULTI-QUEUE FIFO MEMORY DEVICES THAT SUPPORT FLOW-THROUGH OF WRITE AND READ COUNTER UPDATES USING MULTI-PORT FLAG COUNTER REGISTER FILES

REFERENCE TO PRIORITY APPLICATION

This application claims priority to Provisional Application Ser. No. 60/555,716, filed Mar. 23, 2004 the disclosure of which is hereby incorporated herein by reference.

FIELD OF THE INVENTION

The present invention relates to integrated circuit memory devices and methods of operating same, and more particularly, to first-in first-out (FIFO) memory devices and methods of operating same.

BACKGROUND OF THE INVENTION

Multi-queue first-in first-out (FIFO) memory devices may use register files to maintain write flag and read flag counter values for each of a plurality of queues supported by the FIFO memory device. These counter values are typically used as operands when calculating full, almost-full, empty and almost-empty flag conditions on a per queue basis. A conventional multi-port register file may include a plurality of multi-port latch cells (e.g., multi-port SRAM cells). As illustrated by FIG. 1, a conventional multi-port latch cell 10 includes a write port, a pass gate (e.g, CMOS transmission gate), a latch, and first and second read ports. The latch may include a pair of inverters that are connected in antiparallel. The write port is controlled by a pair of differential word lines (shown as UP and UPX), the first read port is controlled by a "read queue" word line RD and the second read port is controlled by a "write queue" word line WR. The latch cell 10 is electrically coupled to three bit lines, shown as DIN, RDOUT and WROUT. The bit lines RDOUT and WROUT are frequently precharged to logic 1 levels (e.g., Vdd) in preparation for each access to a corresponding read port. Based on the illustrated configuration of the latch cell 10, if DIN=0 when the write port is initially accessed, then driving the word line RD to an active high level for short duration will cause the bit line RDOUT to be pulled down to a logic 0 level to reflect a corresponding data value stored within the latch cell. Alternatively, if DIN=1 when the write port is initially accessed, then driving the word line RD to an active high level will not influence the precharged condition of the bit line RDOUT and a logic 1 value will remain at the corresponding read port. The same results also apply to the bit line WROUT when the word line WR is accessed. To prevent contention between the precharge devices (not shown) connected to each bit line RDOUT and WROUT and the pull-down transistors within each latch cell, the word lines RD and WR are not pulsed high when the precharge devices are active.

FIG. 2 illustrates a conventional register file system 20 that may be used in a multi-queue FIFO memory device. The system 20 contains a M×N array of latch cells 10 within a register file 22, where M is a positive integer corresponding to the number of queues supported by the FIFO memory device and N is a positive integer that may equal log2 times a capacity of the FIFO memory device. A bank 24 of address latches receives the word line signals associated with the write port (i.e., UP and UPX) and the word line signals associated with the first and second read ports (i.e., RD and WR). The first clock signal CLK1 is used to synchronize the precharging of the bit lines RDOUT using a first precharge circuit 26a and the second clock signal CLK2 is used to synchronize the precharging of the bit lines WROUT using a second precharge circuit 26b. The first clock signal CLK1 is also used to synchronize the timing of a first bank of latches 28a (e.g., flip-flops (FF)), which are coupled to a first output port OUT1. Similarly, the second clock signal CLK2 is used to synchronize the timing of a second bank of latches 28b (e.g., flip-flops (FF)), which are coupled to a second output port OUT2.

As will be understood by those skilled in the art, the word lines UP and UPX may be activated based on clock signals that are asynchronous relative to the first and second clock signals CLK1 and CLK2. This asynchronous clocking relationship means that new data can be updated into the register file 22 while one or more of the read ports are being accessed and data is being read from the register file 22. This timing overlap may cause incorrect data to be read from the read ports RDOUT and WROUT when the write queue and read queues within the FIFO memory device are the same (i.e., the read word lines RD and WR correspond to the same row as the write word lines UP and UPX). However, even if correct data is read out of the read ports RDOUT and WROUT, sufficient setup times may not be provided before the first and second banks of latches 28a and 28b capture the read data. Such insufficient setup times may result in data and flag generation errors.

Thus, notwithstanding the register file system of FIG. 2, there continues to be a need for improved register file systems that are less susceptible to errors resulting from the asynchronous timing between clock signals associated with the write and read operations within a FIFO memory device.

SUMMARY OF THE INVENTION

First-in first-out (FIFO) memory devices according to embodiments of the present invention support multiple queues and include multi-port register files that provide write count and read count flow-through when the write and read queues are equivalent. According to some of these embodiments, a multi-queue FIFO memory device includes a write flag counter register file therein that is configured to support flow-through of write counter updates to at least one read port of the write flag counter register file. This flow-through occurs when an active write queue and an active read queue within the FIFO memory device are the same. A read flag counter register file is also provided, which supports flow-through of read counter updates to at least one read port of the read flag counter register file when the active write queue and the active read queue are the same. Each of the write and read flag counter register files may utilize multi-port memory cells. These multi-port memory cells may include a write port and at least four read ports that are sequentially accessed during queue switching operations. This relatively large number of read ports supports an early decoding of each register file during queue switching operations.

These FIFO memory devices may also include a first write count generator that is configured to support write queue calculations and a second write count generator that is configured to support read queue calculations. The first write count generator is electrically coupled to a first read port of the write flag counter register file and the second write count generator is electrically coupled to second, third and fourth read ports of the write flag counter register file. In particular, the second write count generator may include a first multiplexer having first and second inputs electrically coupled to the second and third read ports of the write flag counter register file, and a second multiplexer having first and second inputs electrically coupled to the third and fourth read ports of the write flag counter register file.

Multi-queue FIFO memory devices according to further embodiments of the present invention include a write flag counter register file having at least three read ports that are sequentially updated during queue switching. In particular, a write count value is sequentially updated at the at least three read ports during an operation to switch a write queue to an equivalent read queue of the multi-queue FIFO memory device. After the at least three read ports have been sequentially updated, further changes in the write count value will flow-through to each of the at least three read ports while the write and read queues remain the same. In these embodiments, the register file may be formed by a plurality of multi-port cells, with each cell having a write port and at least four read ports and CMOS drivers at each port. These CMOS drivers provide full swing signals that typically do not require capture by a sense amplifier prior to being latched and utilized by downstream flag generation circuitry.

BRIEF DESCRIPTION OF THE DRAWINGS

FIGS. 3A-3B, is a block diagram of a register file system that may be used in a multi-queue FIFO memory device, according to embodiments of the present invention.

DESCRIPTION OF PREFERRED EMBODIMENTS

Figure 1:
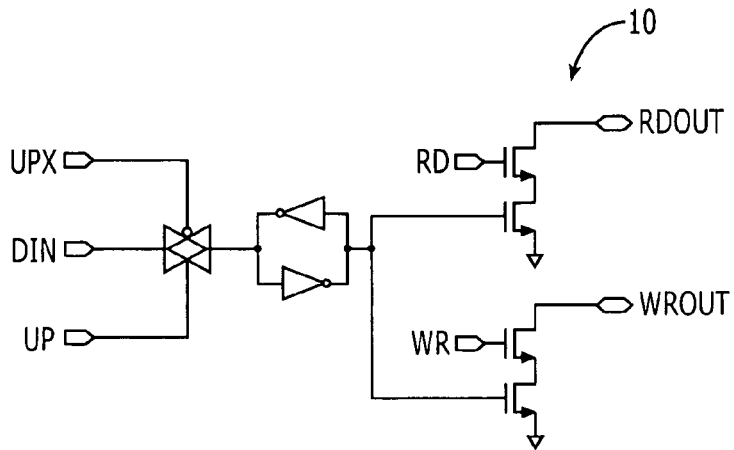
FIG. 1 is an electrical schematic of a conventional latch cell that may be used in a multi-ported register file.

The present invention now will be described more fully herein with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout and signal lines and signals thereon may be referred to by the same reference characters. Signals may also be synchronized and/or undergo minor boolean operations (e.g., inversion) without being considered different signals. The suffix B or X (or prefix symbol "/") to a signal name may also denote a complementary data or information signal or an active low control signal, for example.

Figure 3:
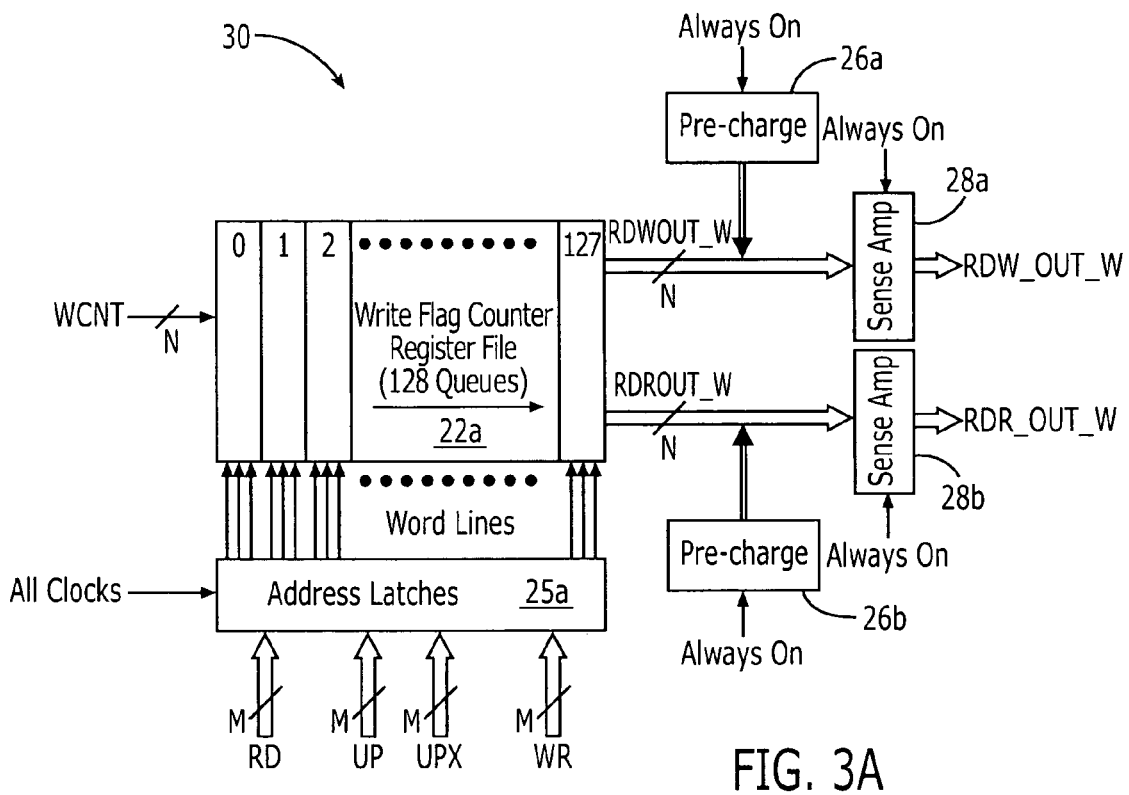
FIG. 3, which includes
Figure 3:

First-in first-out (FIFO) memory devices according to first embodiments of the present invention will now be described with reference to FIGS. 3A-3B. In particular, FIG. 3A illustrates a portion of a register file system 30 that may be utilized in a multi-queue FIFO memory device. This portion of the register file system 30 includes a write flag counter register file 22a and address latches 25a that are electrically coupled to word lines in the write flag counter register file 22a. This write flag counter register file 22a comprises a plurality of multi-port latch cells. These latch cells may be configured as illustrated by FIG. 1, which means the word lines can include UP/UPX associated with a write port and RD and WR associated with the two read ports. Alternative latch cell designs may also be used.

Figure 2:
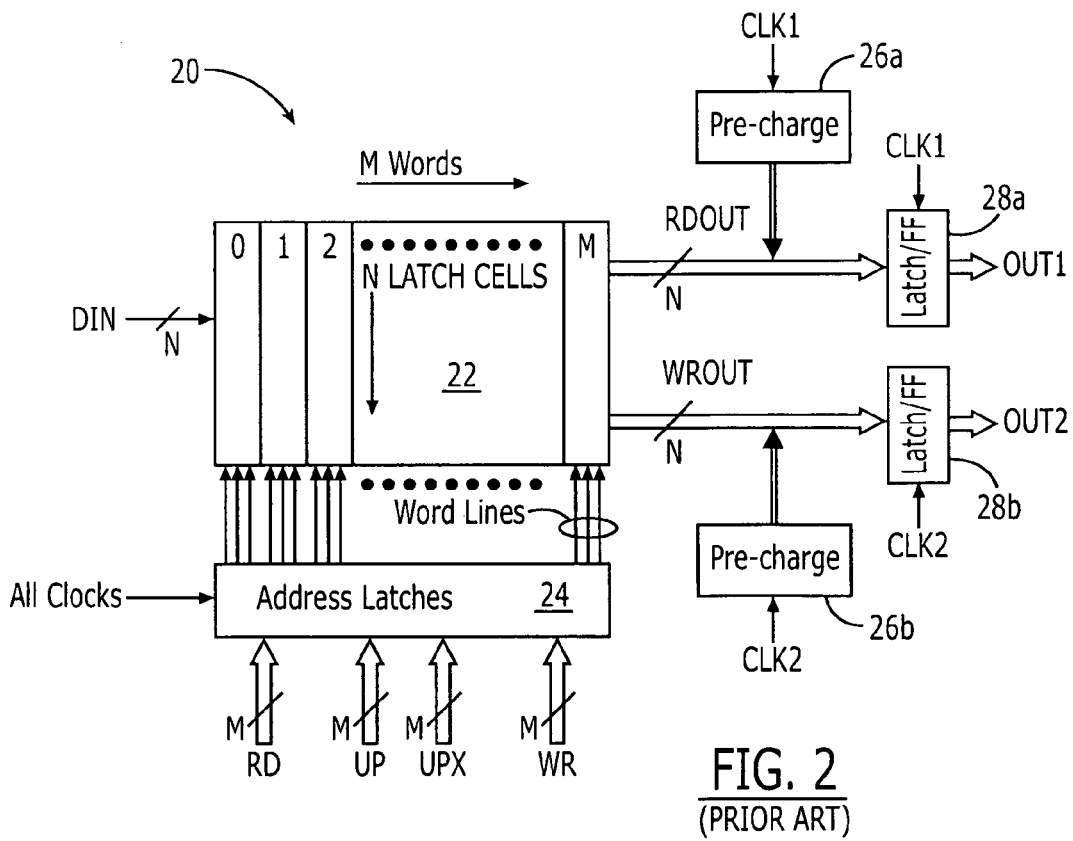
FIG. 2 is a block diagram of a conventional register file system having a single write port and two read ports.

In contrast to the address latches 24 illustrated in FIG. 2, which generate word line signals as relatively short duration pulses, the address latches 25a illustrated by FIG. 3A are configured to generate "always-on" word line signals for a selected address within the write flag counter register file 22a. These always-on word line signals may be provided to selected read ports of the write flag counter register file 22a (i.e., word line signals RD and WR may be held at logic 1 levels when a corresponding address (e.g., read queue address) has been selected). In contrast, the word lines associated with the write port (i.e., UP and UPX) may be always-on or pulsed in-sync with a clock signal associated with write operations.

The read ports of the write flag counter register file 22a, which are illustrated as RDWOUT_W and RDROUT_W, are electrically coupled to respective precharge circuits 26a and 26b. These precharge circuits 26a and 26b are always-on circuits, which means they continuously provide the bit lines associated with the illustrated read ports with some degree of precharge current. The magnitude of the precharge current is sufficient to provide a "gentle" pull-up force to each of the bit lines. This gentle pull-up force may be overcome if a particular pull-down transistor(s) associated with a read port is turned on. In other words, the pull-down transistors within each latch cell are designed to provide a sufficient pull-down strength to overcome the weaker pull-up force exhibited by the precharge circuits whenever a logic 0 value is to be established on a corresponding bit line.

The bit lines associated with the read ports RDWOUT_W and RDROUT_W are electrically coupled to respective sense amplifiers 28a and 28b. These sense amplifiers 28a and 28b are illustrated as always-on sense amplifiers that are connected to respective output ports RDW_OUT_W and RDR_OUT_W. These output ports RDW_OUT_W and RDR_OUT_W may be electrically coupled to respective write count generators (not shown in FIG. 3A).

The flow-through of updated write count values occurs whenever the write queue within the FIFO memory device is switched to a queue that corresponds to the current read queue (or vice versa). Thus, in FIG. 3A, updated write count values WCNT, which may correspond to pointer values within the FIFO, are provided to a write port of the write flag counter register file 22a and then pass directly to the always-on read ports RDWOUT_W and RDROUT_W whenever the address of the write port word lines UP/UPX equals the address of the read port word lines RD and WR (i.e., the write and read queues within the FIFO memory device are equivalent). Accordingly, as a sequence of write operations are performed into an Nth queue within a FIFO memory device, a sequence of write count values WCNT will be loaded into the write flag counter register file 22a in-sync with a clock signal and then passed directly in a flow-through fashion to the read ports RDWOUT_W and RDROUT_W. The updated write count values WCNT are then provided from the read ports to the output ports RDW_OUT_W and RDR_OUT_W, where they are then received by flag generation circuitry associated with the write and read queues. In this manner, updates in the write count values associated with a write queue flow through the register file and are almost immediately made available at the read ports, where they are then used to update flag generation calculations.

Figure 3B:
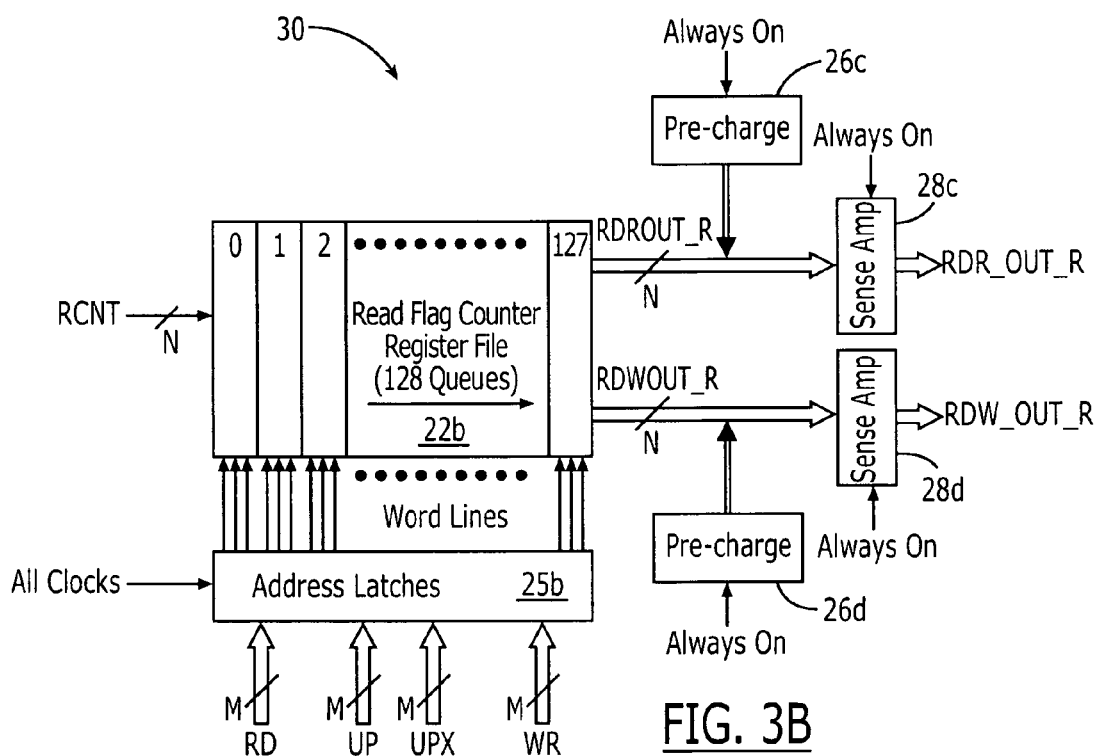

Referring now to FIG. 3B, another portion of the register file system 30 is illustrated as including a read flag counter register file 22b and address latches 25b that are electrically coupled to word lines in the read flag counter register file 22b. This read flag counter register file 22b is essentially identical to the write flag counter register file 22a illustrated by FIG. 3A, however, read count values RCNT instead of write count values WCNT are loaded at the write port. The names of the read ports RDROUT_R, RDWOUT_R and the output ports RDR_OUT_R, RDR_OUT_R have also be modified by changing the suffix "W" (in FIG. 3A) to "R" (in FIG. 3B) to reflect the fact that read count values are being read from the read ports. The always-on precharge circuits associated with the read ports are designated by the reference numerals 26c and 26d and the always-on sense amplifiers are designated by the reference numerals 28c and 28d. Thus, as described above with respect to FIG. 3A, as a sequence of read operations are performed from an Nth queue within a FIFO memory device, a sequence of read count values RCNT will be loaded into the read flag counter register file 22b in-sync with a clock signal and then passed directly in a flow-through fashion to the read ports RDROUT_R and RDWOUT_R. The updated read count values RCNT are then provided from the read ports to the output ports RDR_OUT_R and RDW_OUT_R, where they are then received by flag generation circuitry associated with the write and read queues. In this manner, updates in the read count values associated with a read queue flow through the register file and are almost immediately made available at the read ports, where they are then used to update flag generation calculations.

Figure 4A:
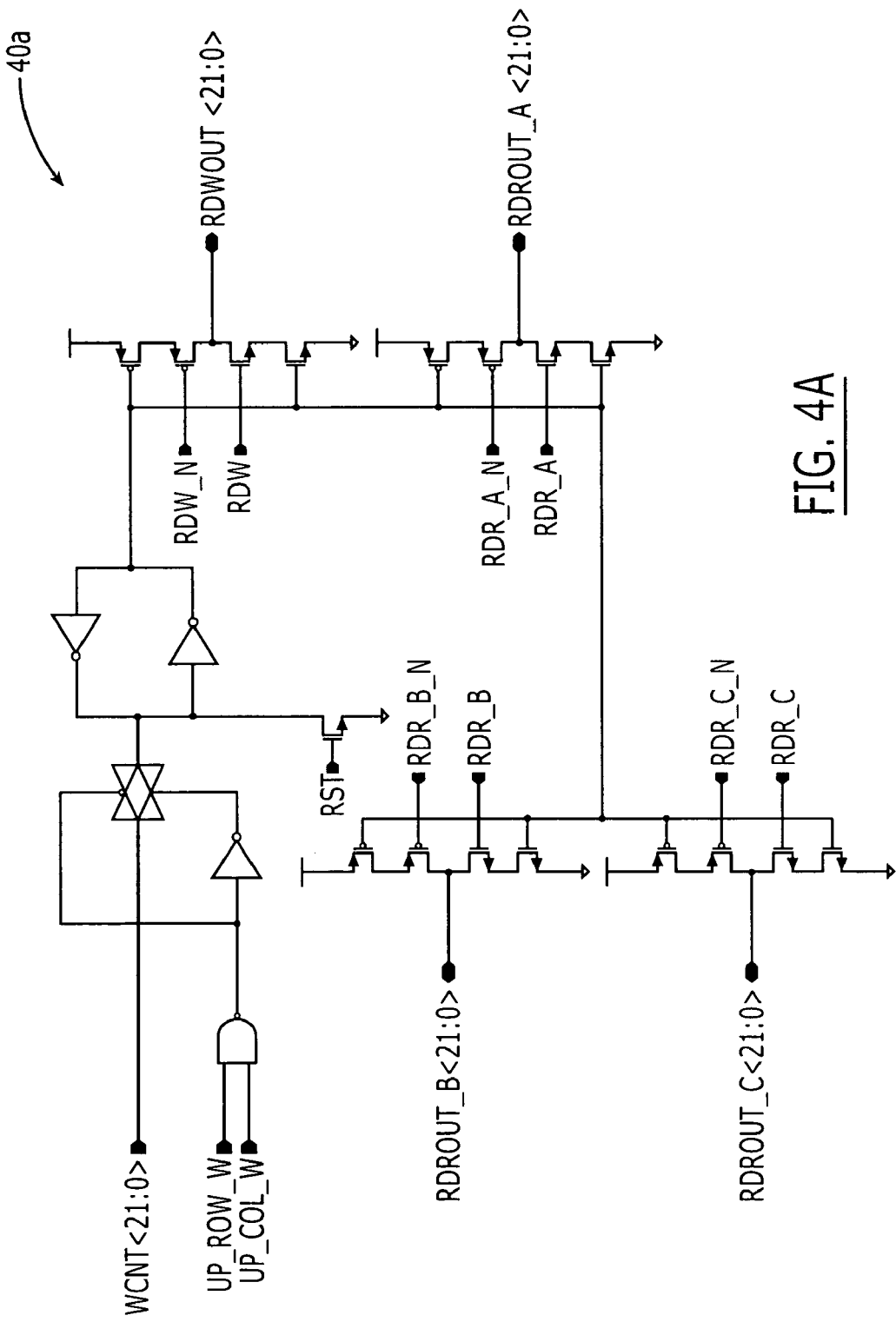
FIGS. 4A-4B are electrical schematics of multi-port latch cells according to embodiments of the present invention.
Figure 4B:
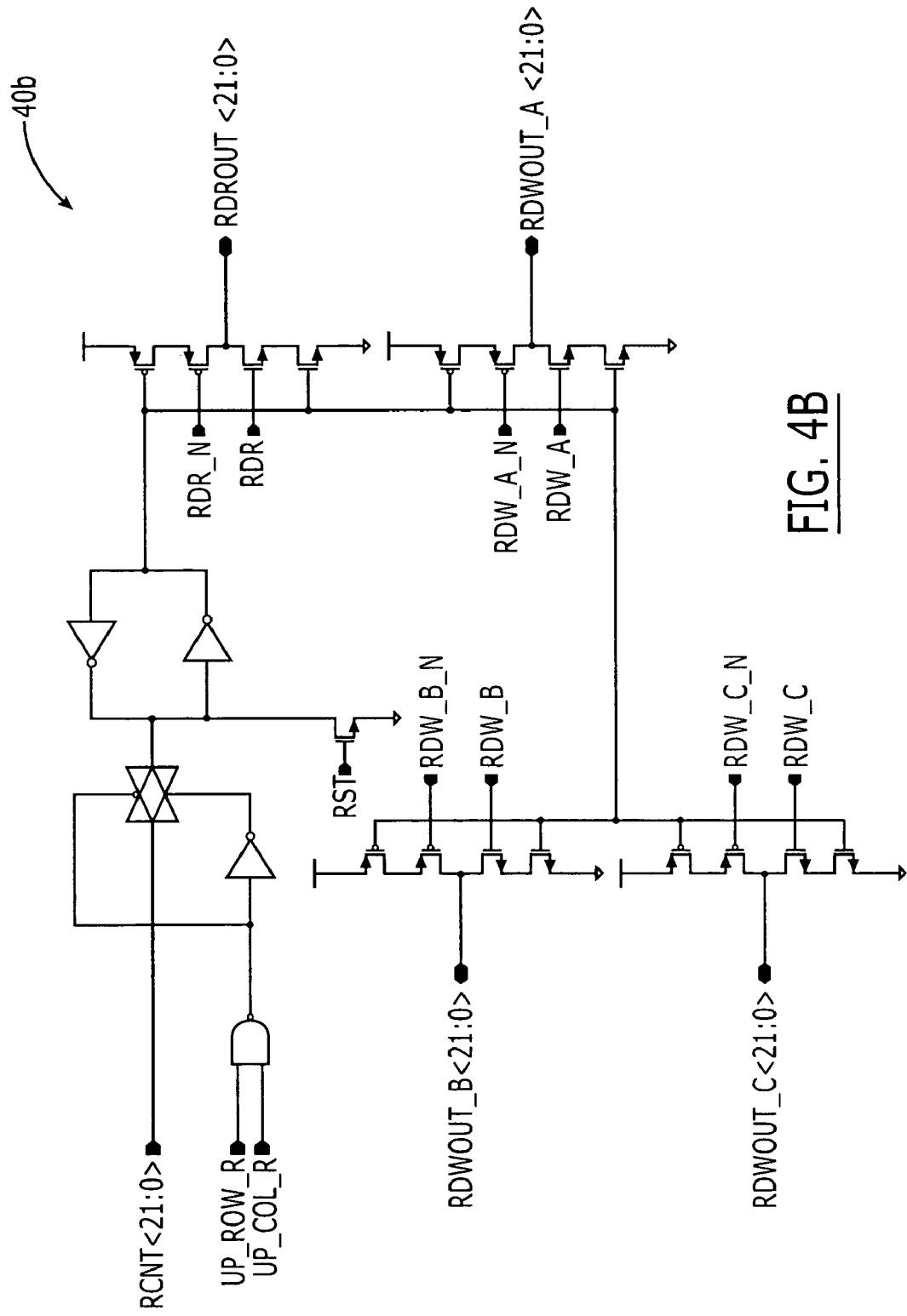
Figure 5A:
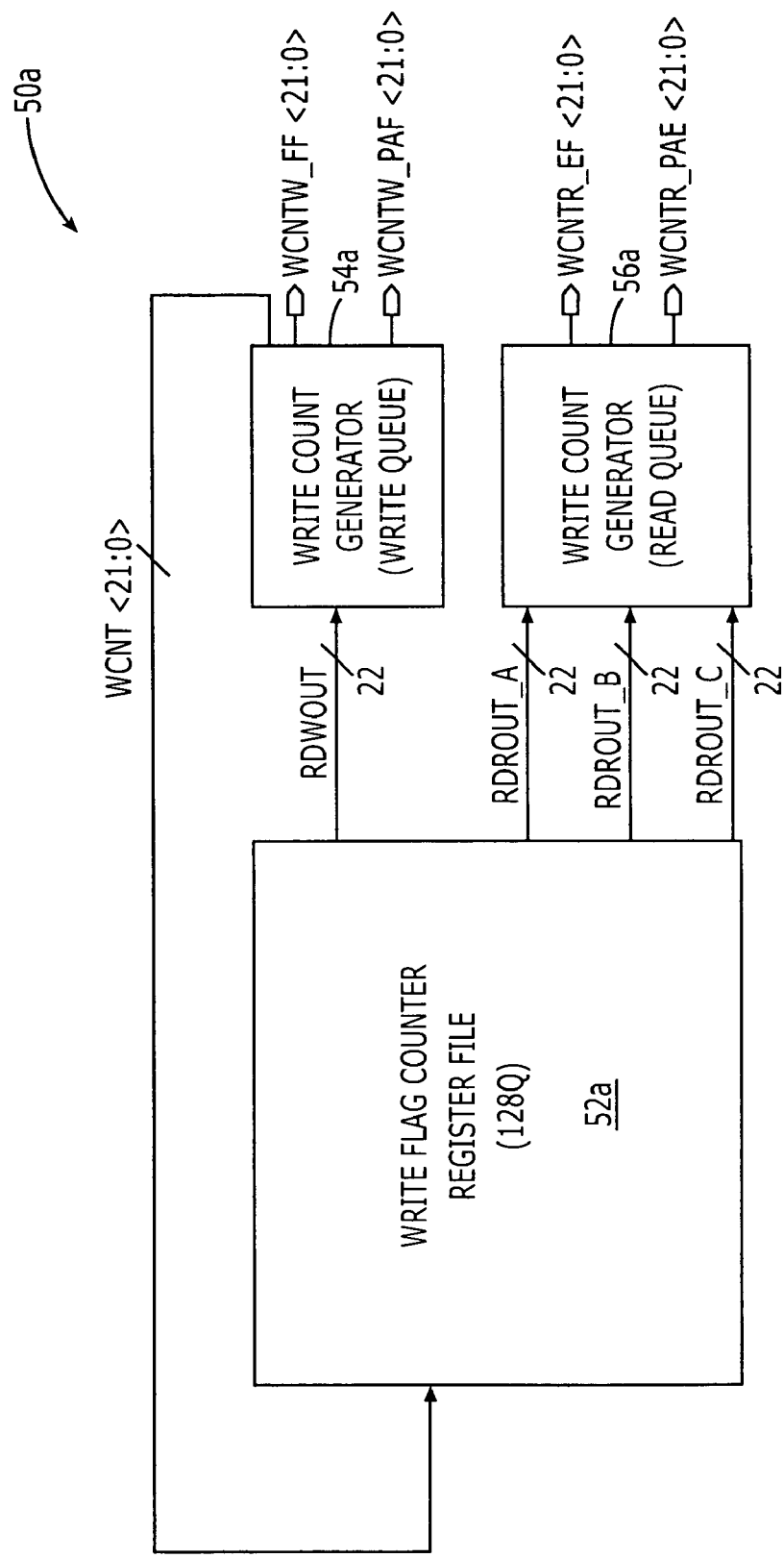
FIG. 5A is a block diagram of a write flag counter register file system according to embodiments of the present invention.

Multi-port register files according to further embodiments of the present invention are illustrated by FIGS. 4A-4B and 5A-5B. In particular, FIG. 4A illustrates a multi-port latch cell 40a that may be used in the write flag counter register file 52a of FIG. 5A, and FIG. 4B illustrates a multi-port latch cell 40b that may be used in the read flag counter register file 52b of FIG. 5B. The multi-port latch cell 40a is illustrated as including a single write port and four read ports. The write port receives a single bit of a multi-bit write count value, which is shown as a 22-bit write count value WCNT<21:0>. The illustrated reference to the full 22-bit write count value WCNT<21:0> signifies that 22 equivalent latch cells 40a may be used within each row of the write flag counter register file 52a. The write port is enabled when the control signals UP_ROW_W and UP_COL_W are both set to active high levels and the illustrated CMOS transmission gate is turned on. Turning on the CMOS transmission gate enables the latch to be loaded with a respective bit of the write count value WCNT<21:0>. This latch is illustrated by a pair of inverters, which are connected in antiparallel. The latch may be reset by setting the reset control signal RST high. The output of the latch is connected to the data input terminals of four CMOS drivers, which drive respective read ports of the latch cell 40a. As illustrated, each of these CMOS drivers includes a totem pole arrangement of two PMOS pull-up transistors and two NMOS pull-down transistors. The four read ports are identified as RDWOUT<21:0>, RDROUT_A<21:0>, RDROUT_B<21:0> and RDROUT_C<21:0>. Here, the reference to a full 22-bit wide read port signifies that 22 equivalent CMOS drivers are used to generate the data at each read port. The data at the output of the latch will be passed to the first read port RDWOUT<21:0> when the corresponding pair of read word lines RDW and RDW_N are driven high and low, respectively. Similarly, the data at the output of the latch will be passed to the second read port RDROUT_A<21:0> when the corresponding pair of read word lines RDR_A and RDR_A_N are driven high and low, respectively. The data at the output of the latch will be passed to the third read port RDROUT_B<21:0> when the corresponding pair of read word lines RDR_B and RDR_B_N are driven high and low, respectively. Finally, the data at the output of the latch will be passed to the fourth read port RDROUT_C<21:0> when the corresponding pair of read word lines RDR_C and RDR_C_N are driven high and low, respectively.

The multi-port latch cell 40b of FIG. 4B is also illustrated as including a single write port and four read ports. The write port receives a single bit of a multi-bit read count value, which is shown as a 22-bit read count value RCNT<21:0>. The reference to the full 22-bit read count value RCNT<21:0> signifies that 22 equivalent latch cells 40b may be used within each row of the read flag counter register file 52b. The write port is enabled when the control signals UP_ROW_R and UP_COL_R are both set to active high levels and the illustrated CMOS transmission gate is turned on. Turning on the CMOS transmission gate enables the latch to be loaded with a respective bit of the read count value RCNT<21:0>. The latch may be reset by setting the reset control signal RST high. The output of the latch is connected to the data input terminals of four CMOS drivers, which drive respective read ports of the latch cell 40b. The four read ports are identified as RDROUT<21:0>, RDWOUT_A<21:0>, RDWOUT_B<21:0> and RDWOUT_C<21:0>. The data at the output of the latch will be passed to the first read port RDROUT<21:0> when the corresponding pair of read word lines RDR and RDR_N are driven high and low, respectively. Similarly, the data at the output of the latch will be passed to the second read port RDWOUT_A<21:0> when the corresponding pair of read word lines RDW_A and RDW_A_N are driven high and low, respectively. The data at the output of the latch will be passed to the third read port RDWOUT_B<21:0> when the corresponding pair of read word lines RDW_B and RDW_B_N are driven high and low, respectively. Finally, the data at the output of the latch will be passed to the fourth read port RDWOUT_C<21:0> when the corresponding pair of read word lines RDW_C and RDW_C_N are driven high and low, respectively.

Figure 5B:
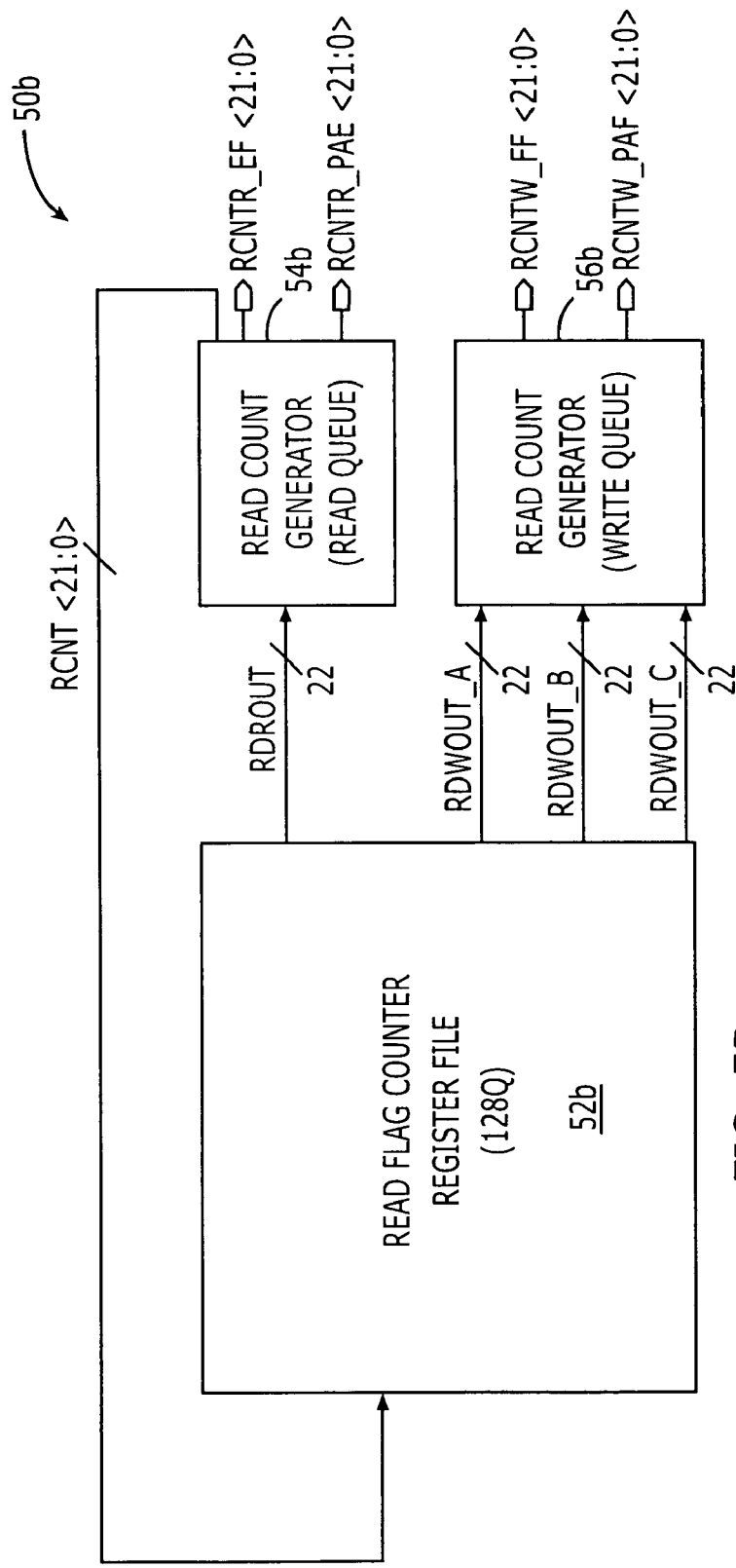
FIG. 5B is a block diagram of a read flag counter register file system according to embodiments of the present invention.

FIG. 5A illustrates a write flag counter register file system 50a that includes a write flag counter register file 52a, a first write count generator 54a associated with a write queue and a second write count generator 56a associated with a read queue. The write flag counter register file 52a is illustrated as supporting 128 queues, which means that 128 addressable rows of the multi-port latch cell 40a of FIG. 4A may be provided within the write flag counter register file 52a. Similar register files that are configured to support a larger or smaller number of queues may also be provided. The first read port RDWOUT<21:0> of the write flag counter register file 52a is electrically coupled to the first write count generator 54a (write queue). The second read port RDROUT_A<21:0>, third read port RDROUT_B<21:0> and fourth read port RDROUT_C<21:0> are electrically coupled to the second write count generator 56a (read queue). FIG. 5B illustrates a read flag counter register file system 50b that includes a read flag counter register file 52b, a first read count generator 54b associated with a read queue and a second read count generator 56b associated with a write queue. The read flag counter register file 52b is illustrated as supporting 128 queues, which means that 128 addressable rows of the multi-port latch cell 40b of FIG. 4B may be provided within the read flag counter register file 52b. The first read port RDROUT<21:0> of the read flag counter register file 52b is electrically coupled to the first read count generator 54b (read queue). The second read port RDWOUT_A<21:0>, third read port RDWOUT_B<21:0> and fourth read port RDWOUT_C<21:0> are electrically coupled to the second read count generator 56b (write queue).

previously captured during QS −1. Finally, beginning in the write queue switch cycle QS 3, the fourth read port RDROUT_C operates to capture a current write count value (WCNT<21:0>), which may be different from the one previously captured during QS 0. Prior to these capture events during the write queue switch cycles QS −1, QS 0 and QS 3, the four read ports will be set at the write count values associated with the immediately previous write queue (WCNT-PQ).

TABLE 1

| QUEUE SWITCH CYCLE | RDWOUT | RDROUT_A | RDROUT_B | RDROUT_C |
|---|---|---|---|---|
| QS −2⁺ | WCNT-PQ | WCNT-PQ | WCNT-PQ | WCNT-PQ |
| QS −1⁺ | CAPTURE WCNT | CAPTURE WCNT | WCNT-PQ | WCNT-PQ |
| QS 0⁺ | WCNT-NQ | WCNT-NQ | CAPTURE WCNT | WCNT-PQ |
| QS 1⁺ | WCNT-NQ | WCNT-NQ | WCNT-NQ | WCNT-PQ |
| QS 2⁺ | WCNT-NQ | WCNT-NQ | WCNT-NQ | WCNT-PQ |
| QS 3⁺ | WCNT-NQ | WCNT-NQ | WCNT-NQ | CAPTURE WCNT |
| QS 4⁺ | WCNT-NQ | WCNT-NQ | WCNT-NQ | WCNT-NQ |

Additional aspects of these read and write count generators are described in U.S. application Ser. No. 11/040,892, entitled "Multiple Counters to Relieve Flag Restriction in a Multi-Queue First-In First-Out Memory System,", filed Jan. 21, 2005, and U.S. application Ser. No. 11/040,637, entitled "Mark/Re-Read and Mark/Re-Write Operations in a Multi-Queue First-In First-Out Memory System,", filed Jan. 21, 2005, the disclosures of which are hereby incorporated herein by reference.

Operations to switch a write queue of a multi-queue FIFO memory device include operations to switch the active row address within the write flag counter register file 52a. In particular, the row address is switched from a row associated with a previous write queue (PQ) to a row associated with a new write queue (NQ). This switching operation results in a redirection of updates in the write count value WCNT<21:0> to a write port associated with a row of latch cells 40a that corresponds to the new write queue. TABLE 1 illustrates the timing of operations to switch a write queue of the FIFO memory device from a previous queue (PQ) to a new queue (NQ), which equals a current read queue of the FIFO memory device. In TABLE 1, the column RDWOUT shows the timing of data that is captured at a first read port of the write flag counter register file 52a and used for write queue calculations. The column RDROUT_A shows the timing of data that is captured at a second read port of the write flag counter register file 52a and used for read queue calculations. Similarly, the columns RDROUT_B and RDROUT_C show the timing of data that is captured at third and fourth read ports of the write flag counter register file 52a and used for read queue calculations. As will now be described with respect to TABLE 1, the relatively large number of read ports supports an early decoding of a new address in the register file (e.g., one cycle early) and an early generation of data that is available during the queue switch. This early decoding eliminates the address decoding operations from the timing critical path associated with the write queue operations. Thus, beginning in the write queue switch cycle QS −1, the first read port RDWOUT associated with the write queue and the second read port RDROUT_A associated with the read queue operate to capture a current write count value (WCNT<21:0>). Thereafter, beginning in the write queue switch cycle QS 0, the third read port RDROUT_B operates to capture a current write count value (WCNT<21:0>), which may be different from the one Operations to switch a read queue of a multi-queue FIFO memory device include operations to switch the active row address within the read flag counter register file 52b. In particular, the row address is switched from a row associated with a previous read queue (PQ) to a row associated with a new read queue (NQ). This switching operation results in a redirection of updates in the read count value RCNT<21:0> to a write port associated with a row of latch cells 40b that corresponds to the new read queue. TABLE 2 illustrates the timing of operations to switch a read queue of the FIFO memory device from a previous queue (PQ) to a new queue (NQ), which equals a current write queue of the FIFO memory device. In TABLE 2, the column RDROUT shows the timing of data that is captured at a first read port of the read flag counter register file 52b and used for read queue calculations. The column RDWOUT_A shows the timing of data that is captured at a second read port of the read flag counter register file 52b and used for write queue calculations. Similarly, the columns RDWOUT_B and RDWOUT_C show the timing of data that is captured at third and fourth read ports of the read flag counter register file 52b and used for write queue calculations. As will now be described with respect to TABLE 2, the relatively large number of read ports supports an early decoding of a new address in the register file (e.g., one cycle early) and an early generation of data that is available during the queue switch. This early decoding eliminates the address decoding operations from the timing critical path associated with the read queue operations. Thus, beginning in the read queue switch cycle QS −1, the first read port RDROUT associated with the read queue and the second read port RDWOUT_A associated with the write queue operate to capture a current read count value (RCNT<21:0>). Thereafter, beginning in the read queue switch cycle QS 0, the third read port RDWOUT_B operates to capture a current read count value (RCNT<21:0>), which may be different from the one previously captured during QS −1. Finally, beginning in the read queue switch cycle QS 3, the fourth read port RDWOUT_C operates to capture a current read count value (RCNT<21:0>), which may be different from the one previously captured during QS 0. Prior to these capture events during the read queue switch cycles QS −1, QS 0 and QS 3, the various read ports will be set at the read count values associated with the immediately previous read queue (RCNT-PQ).

TABLE 2

| QUEUE SWITCH CYCLE | RDROUT | RDWOUT_A | RDWOUT_B | RDWOUT_C |
| --- | --- | --- | --- | --- |
| QS −2⁺ | RCNT-PQ | RCNT-PQ | RCNT-PQ | RCNT-PQ |
| QS −1⁺ | CAPTURE RCNT | CAPTURE RCNT | RCNT-PQ | RCNT-PQ |
| QS 0⁺ | RCNT-NQ | RCNT-NQ | CAPTURE RCNT | RCNT-PQ |
| QS 1⁺ | RCNT-NQ | RCNT-NQ | RCNT-NQ | RCNT-PQ |
| QS 2⁺ | RCNT-NQ | RCNT-NQ | RCNT-NQ | RCNT-PQ |
| QS 3⁺ | RCNT-NQ | RCNT-NQ | RCNT-NQ | CAPTURE RCNT |
| QS 4⁺ | RCNT-NQ | RCNT-NQ | RCNT-NQ | RCNT-NQ |

Figure 5C:
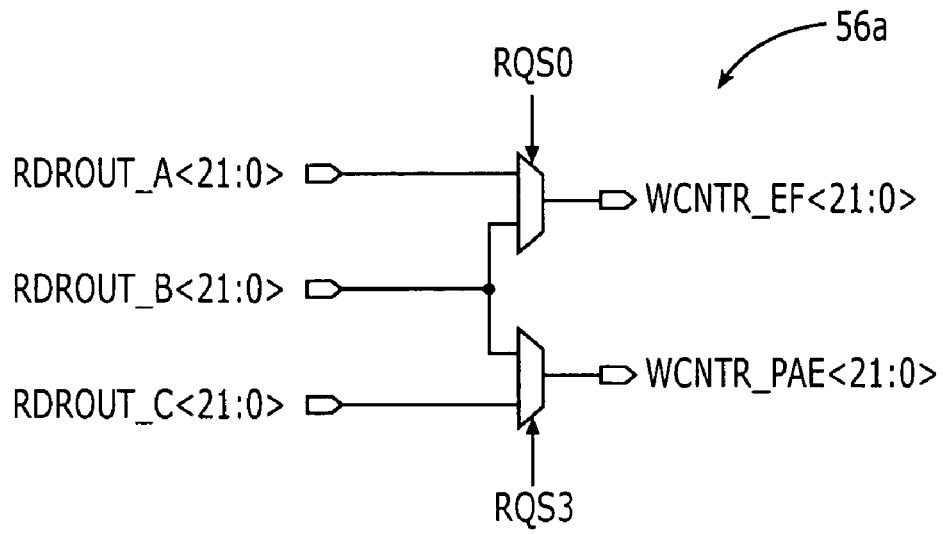
FIG. 5C is an electrical schematic of a write count generator according to embodiments of the present invention.

An embodiment of the write count generator 56a of FIG. 5A is illustrated in FIG. 5C as including 22 pairs of two-input multiplexers. The first multiplexers in the pairs generate a write counter value (WCNTR_EF<21:0>) to be used in empty flag (EF) calculations, whereas the second multiplexers in the pairs generate a write counter value (WCNTR_PAE<21:0>) to be used in programmable almost empty (PAE) flag calculations. The select signal provided to the first multiplexers is shown as the read queue switch zero (RQS0) pulse signal and the select signal provided to the second multiplexers is shown as the read queue switch three (RQS3) pulse signal. As illustrated by TABLE 3, when the read queue switch zero (RQS0) pulse signal is active during queue switch cycle QS 0, the value of the write count value at the second read port RDROUT_A is used as the write counter value for empty flag calculations. Otherwise, the value of the write count value at the third read port RDROUT_B is used as the write counter value for WCNTR_EF<21:0>. In contrast, when the read queue switch three (RQS3) pulse signal is active during queue switch cycle QS 3, the value of the write count value at the third read port RDROUT_B is used as the write counter value for programmable almost empty flag calculations. Otherwise, the value of the write count value at the fourth read port RDROUT_C is used as the write counter value for WCNTR_PAE<21:0>.

Figure 5D:
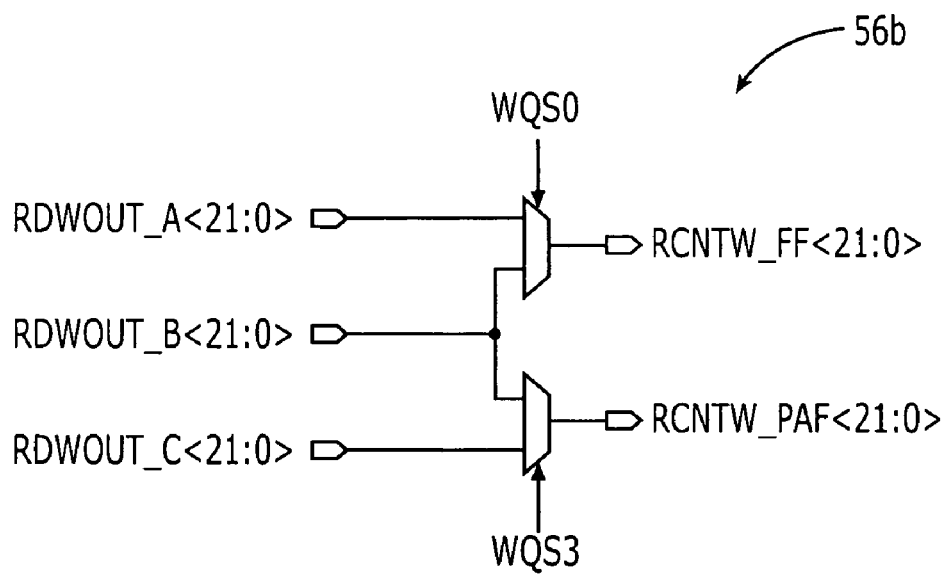
FIG. 5D is an electrical schematic of a read count generator according to embodiments of the present invention.
Figure 5E:
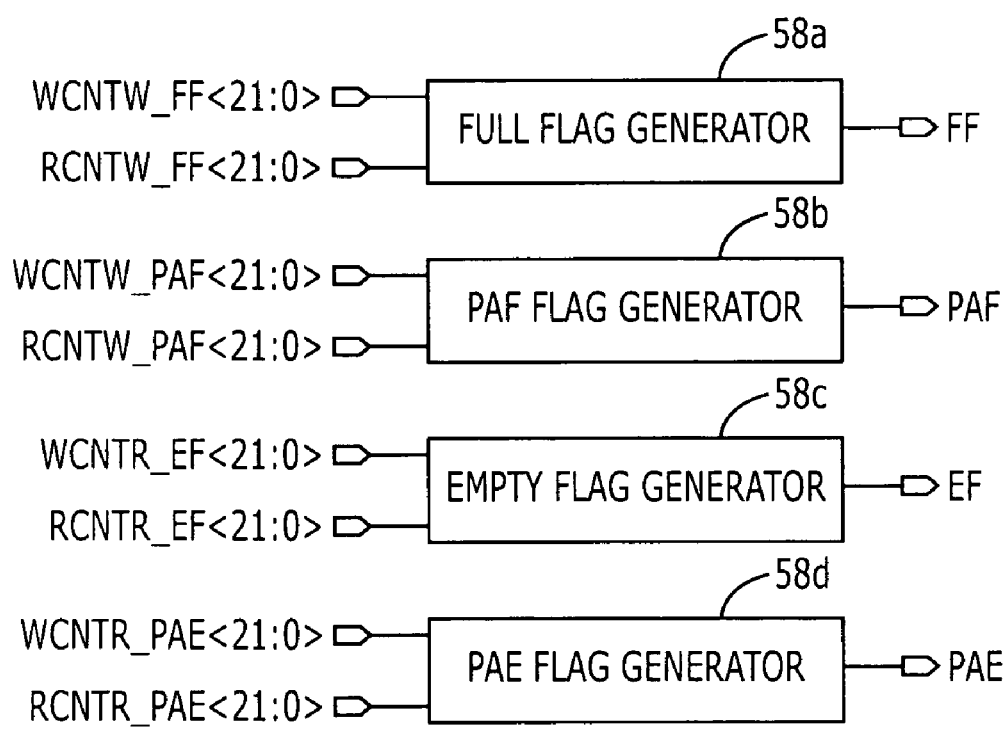
FIG. 5E is a block diagram of a flag generator circuit that may be used with the register file systems of FIGS. 5A-5B.

An embodiment of the read count generator 56b of FIG. 5B is illustrated in FIG. 5D as including 22 pairs of two-input multiplexers. The first multiplexers in the pairs generate a read counter value (RCNTR_FF<21:0>) to be used in full flag (FF) calculations, whereas the second multiplexers in the pairs generate a read counter value (RCNTR_PAF<21:0>) to be used in programmable almost full (PAF) flag calculations. The select signal provided to the first multiplexers is shown as the write queue switch zero (WQS0) pulse signal and the select signal provided to the second multiplexers is shown as the write queue switch three (WQS3) pulse signal. As illustrated by TABLE 3, when the write queue switch zero (WQS0) pulse signal is active during queue switch cycle QS 0, the value of the read count value at the second read port RDWOUT_A is used as the read count value for full flag calculations. Otherwise, the value of the read count value at the third read port RDWOUT_B is used as the read count value for RCNTW_FF<21:0>. In contrast, when the write queue switch three (WQS3) pulse signal is active during queue switch cycle QS 3, the value of the write count value at the third write port RDWOUT_B is used as the read counter value for programmable almost full flag calculations. Otherwise, the value of the read count value at the fourth read port RDWOUT_C is used as the read count value for RCNTW_PAF<21:0>.

TABLE 3

| QUEUE SWITCH CYCLE | WCNTR_EF (READ QUEUE) | WCNTR_PAE (READ QUEUE) | RCNTW_FF (WRITE QUEUE) | RCNTW_PAF (WRITE QUEUE) |
| --- | --- | --- | --- | --- |
| QS −2⁺ | RDROUT_B | RDROUT_C | RDWOUT_B | RDWOUT_C |
| QS −1⁺ | RDROUT_B | RDROUT_C | RDWOUT_B | RDWOUT_C |
| QS 0⁺ | RDROUT_A | RDROUT_C | RDWOUT_A | RDWOUT_C |
| QS 1⁺ | RDROUT_B | RDROUT_C | RDWOUT_B | RDWOUT_C |
| QS 2⁺ | RDROUT_B | RDROUT_C | RDWOUT_B | RDWOUT_C |
| QS 3⁺ | RDROUT_B | RDROUT_B | RDWOUT_B | RDWOUT_B |
| QS 4⁺ | RDROUT_B | RDROUT_C | RDWOUT_B | RDWOUT_C |

A flag generator circuit that may be used with the register file systems of FIGS. 5A-5D includes a full flag (FF) generator 58a, a programmable almost full flag (PAF) generator 58b, an empty flag (EF) generator 58c and a programmable almost empty (PAE) flag generator 58d. These flag generators 58a-58d may include conventional comparator circuits that evaluate a difference between a write count value (e.g., WCNTW_FF, WCNTW_PAF, WCNTR_EF and WCNTR_PAE) and a corresponding read count value (e.g., RCNTW_FF, RCNTW_PAF, RCNTR_FF and RCNTR_PAF) associated with corresponding write and read queues.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An integrated circuit chip, comprising:
 a multi-queue first-in first-out (FIFO) memory device having a write flag counter register file therein that is configured to support flow-through of write counter updates to at least first, second, third and fourth read ports of the write flag counter register file when an active write queue and an active read queue within said FIFO memory device are the same, said multi-queue FIFO memory device further comprising:
  a first write count generator having a first input electrically connected to the first read port, said first write count generator configured to generate at least one flag associated with the active write queue; and a second write count generator having second, third and fourth inputs electrically connected to the second, third and fourth read ports, respectively, said second write count generator configured to generate at least one flag associated with the active read queue; and wherein said write flag counter register file is configured to update the first read port associated with the active write queue and the second read port associated with the active read queue with an equivalent write count value during an operation to switch a write queue of said multi-queue FIFO memory device to an equivalent read queue of said multi-queue FIFO memory device; and wherein said write flag register file is further configured to sequentially update the second, third and fourth ports with respective write count values during the operation to switch the write queue of said multi-queue FIFO memory device to the equivalent read queue of said multi-queue FIFO memory device.

2. The integrated circuit chip of claim 1, wherein said multi-queue FIFO memory device further comprises a read flag counter register file that is configured to support flow-through of read counter updates to at least one read port of the read flag counter register file when the active write queue and the active read queue are the same.

3. The integrated circuit chip of claim 1, wherein said second write count generator comprises:
a first multiplexer having first and second inputs electrically coupled to the second and third read ports of the write flag counter register file; and
a second multiplexer having first and second inputs electrically coupled to the third and fourth read ports of the write flag counter register file.

4. The integrated circuit chip of claim 1, wherein said first write count generator is configured to generate a write count value associated with a full flag calculation and a write count value associated with a programmable almost full flag calculation.

5. The integrated circuit chip of claim 4, wherein said second write count generator is configured to generate a write count value associated with an empty flag calculation and a write count value associated with a programmable almost empty flag calculation.

6. A multi-queue FIFO memory device, comprising:
a write flag counter register file having first, second, third and fourth multi-bit read ports;
a first write count generator configured to generate two flags associated with an active write queue, in response to a first count value generated at the first multi-bit read port of said write flag counter register file; and
a second write count generator configured to generate two flags associated with an active read queue, in response to second, third and fourth count values generated at the second, third and fourth multi-bit read ports of said write flag counter register file, respectively;
wherein said write flag counter register file is configured to capture the first and second count values as equivalent values at the first and second multi-bit read ports, respectively, during an equivalent cycle of a write queue switch operation; and
wherein said write flag counter register file is configured to sequentially capture the second, third and fourth count values at the second, third and fourth multi-bit read ports, respectively, during different cycles of the write queue switch operation.

7. The multi-queue FIFO memory device of claim 6, wherein said second write count generator comprises:
a first multiplexer device having first and second inputs electrically coupled to the second and third multi-bit read ports of said write flag counter register file, respectively; and
a second multiplexer device having first and second inputs electrically coupled to the third and fourth multi-bit read ports of said write flag counter register file, respectively.

* * * * *